United States Patent [19]

Kennedy et al.

[11] Patent Number: 4,671,460
[45] Date of Patent: Jun. 9, 1987

[54] DOOR THRUST REVERSER FOR A JET ENGINE

[75] Inventors: John F. Kennedy, Boulogne; Alain Fournier, Clamart, both of France

[73] Assignee: Societe de Construction des Avions Hurel-Dubois, France

[21] Appl. No.: 757,045

[22] Filed: Jul. 19, 1985

[30] Foreign Application Priority Data

Jul. 24, 1984 [FR] France .................. 84 11732

[51] Int. Cl.$^4$ .............................. B64C 15/00
[52] U.S. Cl. ...................... 239/265.19; 60/230; 239/265.37
[58] Field of Search ............ 239/265.19, 265.25, 239/265.27, 265.29, 265.33, 265.37; 60/230

[56] References Cited

U.S. PATENT DOCUMENTS

| 2,839,891 | 6/1958 | Drakeley | 239/265.19 |
|---|---|---|---|
| 3,002,342 | 10/1961 | Schatzki | 239/265.37 X |
| 3,531,049 | 9/1970 | Hom | 239/265.29 |
| 3,532,275 | 10/1970 | Hom et al. | 239/265.33 |
| 3,550,855 | 12/1970 | Feld et al. | 239/265.29 |
| 3,567,128 | 3/1971 | Urguhart et al. | 239/265.29 |
| 3,576,337 | 4/1971 | Gudde | 292/201 |
| 4,147,027 | 4/1979 | Greathouse | 60/226 |
| 4,212,442 | 7/1980 | Fage | 239/265.29 X |

FOREIGN PATENT DOCUMENTS

| 1134418 | 5/1955 | France . |
|---|---|---|
| 2494775 | 11/1980 | France . |
| 820771 | 11/1957 | United Kingdom . |

Primary Examiner—Andres Kashnikow
Assistant Examiner—Daniel R. Edelbrock
Attorney, Agent, or Firm—Steele, Gould & Fried

[57] ABSTRACT

The invention provides a thrust inverser for a jet engine comprising doors 5-6 pivotably mounted at 14 on two beams diametrically opposite with respect to the gas discharge channel 2. The mechanism for operating the doors is entirely contained in the closed caisson formed by one of the beams 3, this mechanism comprising an actuating cylinder 15 driving a transmission piece 21 suspended from the beam 3, the transmission piece being coupled to two links 28 pivotably secured to the doors 5 and 6.

3 Claims, 4 Drawing Figures

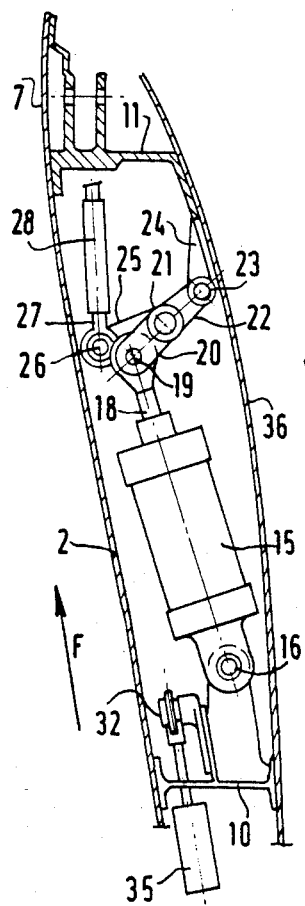
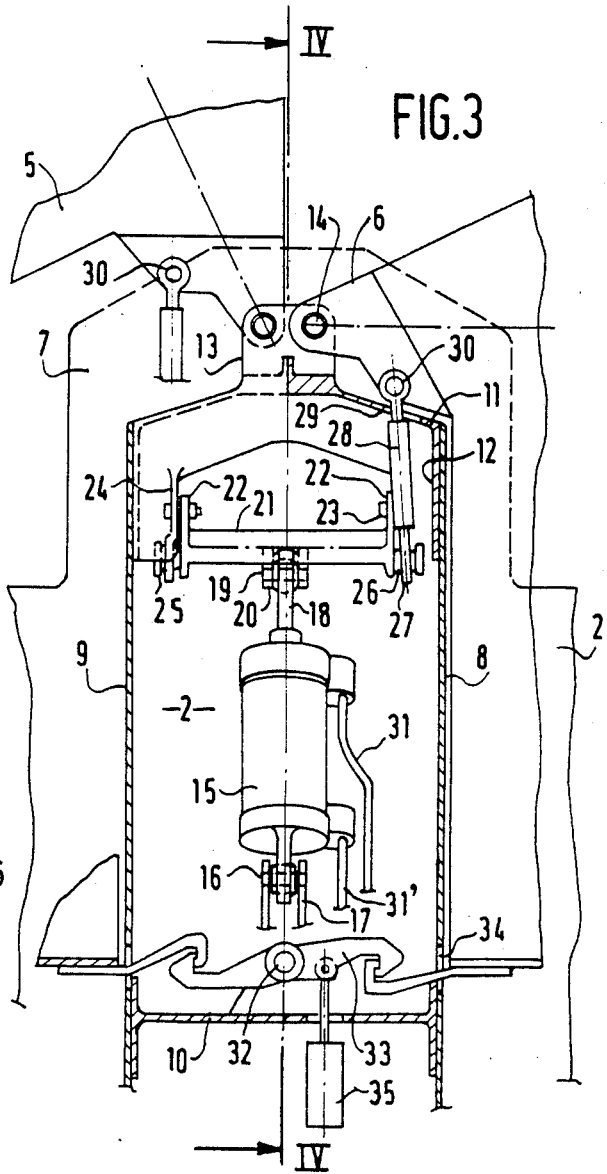

DOOR THRUST REVERSER FOR A JET ENGINE

The present invention relates to a thrust reverser of the "door type" for a jet engine, intended more particularly for equipping an aircraft. It relates more specifically to an arrangement of the system for operating the doors.

From the U.S. Pat. No. 4,147,027 in particular, door thrust reversers are known having a rear body with an internal channel for removing the gases and two doors hinged for pivoting respectively about pivots fixed to two beams integral with the rear body and diametrically opposite; a single operating system providing opening and closing of the doors. Such an operating system is formed by an actuating cylinder controlled by two links driving respectively each of the doors.

However, the arrangement of the operating system of the above mentioned patent has a number of disadvantages which may have repercussions on the reliability and life span of the system. In fact, in the first place, this system provides for the use of links of great length having considerable lateral deflection which risks causing lateral flexion of the links. In the second place, in this known arrangement, the whole of the operating forces is borne by the operating cylinder; the cylinder therefore provides alone, besides its thrust force generating function, the functions of guiding the links and transmitting to the beam the reaction forces of the doors. In the third place, this arrangement means that the links are directly in contact with the flow of hot gas leaving the engine when the doors are opened out.

The present invention provides an improvement to the above arrangement for overcoming the above mentioned disadvantages while providing a more compact system, protected against the risks of damage and mechanically more reliable.

In accordance with the invention, the reverser is characterized by the fact that one of the beams forms a totally closed caisson, isolating the control mechanism from the influence of the hot jet of exhaust gases, the whole of this mechanism being housed in the caisson and having between the actuating cylinder and the links a transmission piece ensuring a small lateral deflection of the links during movement thereof. The caisson has on the gas discharge channel side a rear face formed by the wall of the internal channel; two lateral longitudinal members extending parallel to the axis of the engine; a front face formed by a rounded cover and a cross piece connecting together the lateral fittings in the pivoting zone of the doors, said cross piece having only two apertures for passing the links therethrough, the base of the caisson being formed by a shoulder of the rear body joining its external wall to the internal channel.

For isolating the ends of the links coupled to the doors from the influence of the hot flow, the rear face of the caisson is extended beyond the cross piece by a flange.

The actuating cylinder is situated at the base of the caisson, opposite the links with respect to the transmission piece, which allows a compact cylinder to be used.

The transmission piece is formed by a rigid body suspended for pivoting by two lugs hingedly secured to pins integral with the lateral fittings of the beam, the body further comprising a median fork joint in which the head of the actuating cylinder is pivotably mounted and two lateral fork joints for hingedly mounting the link feet. The median and lateral fork joints are situated opposite the lugs with respect to the body. Thus, the mechanical forces borne by the links are transmitted directly to the beam through the body, which avoids using an overdimensioned cylinder as in the case of U.S. Pat. No. 4,147,027.

Preferably, the lugs for suspending the body are situated in the same zone as the fork joints coupling the link feet, whereas the fork joint in which the cylinder pivots is situated in the middle of the body.

Other features of the invention will appear from the following description of a preferred embodiment with reference to the accompanying drawings in which:

FIG. 3 is a front view on a larger scale of the mechanism for operating the doors; and FIG. 4 is a section through line IV—IV of FIG. 3.

Figure 1:
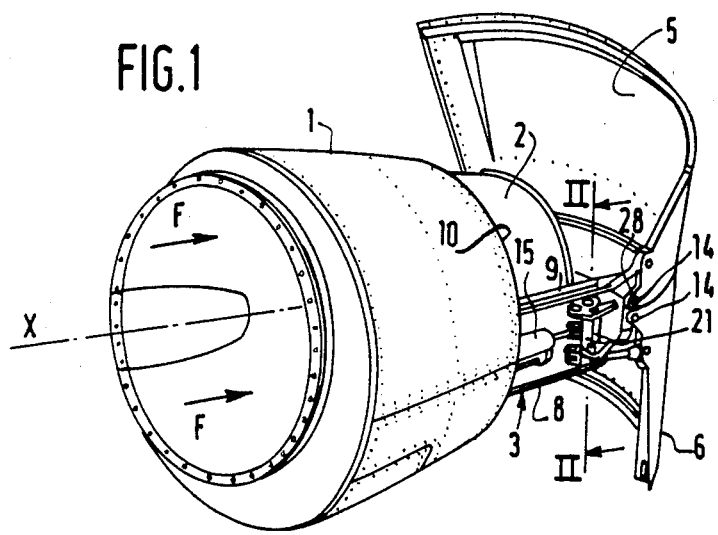
FIG. 1 is a perspective view of a reverser in accordance with the invention.
Figure 2:
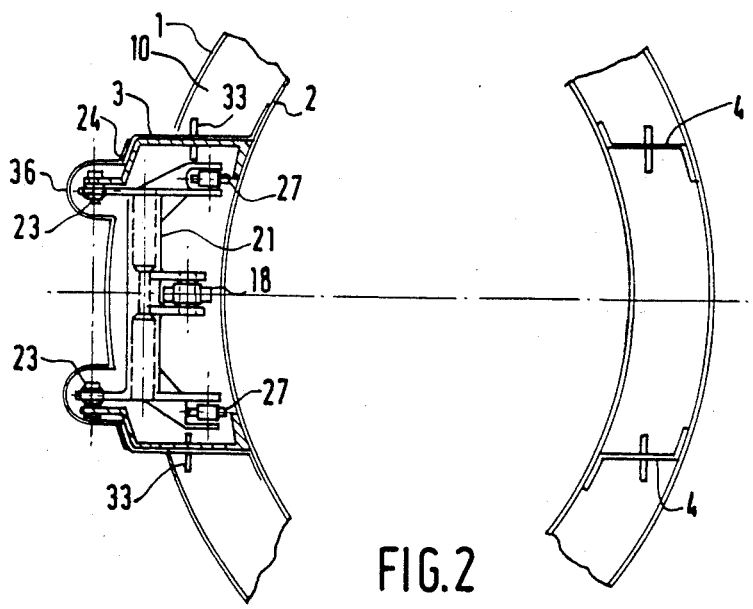
FIG. 2 is a section through line II—II of FIG. 1.

In the drawings only the rear part of a twin flow aircraft jet engine has been shown whose axis is indicated at X. At 1 is shown the rear body of the engine and at 2 the extension of the ejection channel centered on axis X.

Arrows F show the flow direction of the burnt gases coming from the engine and the air flow from the fan (not shown). Two diametrically opposite beams designated respectively by references 3 and 4 extend in the extension of rear body 1 with which they are integrally connected. At the downstream end of the beams two doors 5 and 6 of the thrust reverser are mounted for pivoting about pivots 14—14.

In the cruising position, these doors are retracted into the alignment of the rear body and let the gases flow freely. In the thrust reversal position, they swing into the opened out position shown in FIG. 1 by coming into abutment against each other so as to obstruct the gas jet and deflect it laterally through openings which they free downstream of the extension 2 of the fan. In the embodiment shown, the external wall of the rear body 1 is off centered with respect to axis X of the engine because the invention has been adapted to a particular type of aircraft, but it will be readily understood that the invention applies just as well in the case of rear bodies with concentric walls.

The mechanism for operating the doors is housed in beam 3 which will be described in greater detail with reference to FIGS. 3 and 4.

In the extension of the wall of extension 2 of the fan is provided a flange 7 which extends downstream beyond the beam properly speaking and which isolates this latter from the gas jet.

Beam 3 has the form of a closed caisson whose bottom is formed by wall 2 and by flange 7, whose side walls are formed by two side members 8 and 9 fixed at their base to shoulder 10 connecting the external wall 1 of the rear body to the extension 2 of the channel of the fan, the side members 8 and 9 extend parallel to axis X and are joined together at their downstream end by a cross piece 11 having the general shape of an inverted U whose arms 12 are rigidly fixed to side members 8 and 9. In a central fork joint 13 of the cross piece doors 5 and 6 are mounted for pivoting about pivots 14.

An actuating cylinder 15 pivotably mounted at 16 in a support 17 fixed to the base of the caisson extends in the direction of the cross piece 11 and its rod 18 is mounted for pivoting at 19 in a median fork joint 20 fixed to a transmission piece 21 having two end lugs 22 pivoting on pivot pins 23 carried by fixed brackets 24 secured to each of the side members 8-9. The transmission body 21 is thus pivotably suspended from pins 23 so that the mechanical forces are transmitted to the side members of beam 3.

At the ends of piece 21 are also provided two fork joints 25 situated opposite lugs 23 and in which are mounted for pivoting about pins 26 the feet 27 of two links 28 which extend beyond the cross piece 11 in which are formed appropriate apertures 29 equipped with seals (not shown). The heads of links 28 are pivotably fixed respectively at 30 to each of the doors 5-6 in a zone removed from pivot 14. Naturally, the links may be adjusted in length, but once adjusted they are totally indeformable and transmit to the doors the thrust of operating cylinder 15 whose hydraulic fluid supply pipes are shown at 30 and 31'.

As can be seen particularly well in FIG. 4, the median fork joint 20 is also situated opposite lugs 22 with respect to body 21. In this separation, fork joints 20 and 25 are situated in the vicinity of wall 2. Furthermore, the pivot pins 26 for the links are situated further away from the pivot pin 23 of body 21 than the pivot pin 19 of the operating cylinder.

Thus, the whole of the mechanism for operating the reverser doors are protected from the hot jet and the relatively fragile moving parts are protected against the risks of damage.

For closing the caisson on the external side, a removable cover 36 has been provided which gives ready access to the mechanism, this cover being situated in the extension of the outer wall of the rear body.

Furthermore, bolts 33 may also be mounted inside the caisson for holding the doors in the retracted position, each bolt being formed by an S shaped hook hinged at 32 to the fixed structure and actuated by a hydraulic bolt cylinder 35 housed in the caisson. The end of the hooks intended to cooperate with the door extend then from the caisson through a window 34 formed in the side member 8-9.

We claim:

1. A door thrust reverser for a jet engine having a rear body forming an outer wall and defining an internal channel for removing the gases, two doors hinged respectively about pivot means fixed to diametrically opposite beams secured to said rear body, one of said beams forming a totally closed caisson and having on a side thereof directed toward the internal channel for removing the gases a rear face forming a wall of said intenal channel, two side members extending parallel to an axis of the engine; a front face formed by a removable cover; a cross piece connecting said two side members together to movably define a pivoting zone of said doors, said cross piece having two apertures; a base of the caisson being formed by a shoulder of the rear body between an outer wall of the rear body and said internal channel; said closed caisson enclosing a single operating device forcibly opening and closing the doors, said door thrust reverser comprising:
   an actuating cylinder pivotally mounted on said shoulder,
   a transmission piece hingedly mounted to pivot on said beams and on which is pivotally mounted a head of the actuating cylinder, extension and retraction of the cylinder causing rotation of the transmission piece,
   two links pivotally mounted to said transmission piece, extending through said two apertures of the cross piece and each of the links being coupled respectively to one of said doors, said rotation of the transmission piece being actuated by the cylinder and causing movement of said links through said apertures and corresponding movement of the doors, the transmission piece being pivotably suspended by two lugs hingedly mounted on pivot means fixed to the side members of the beam, the transmission piece having a median fork joint at which is pivotably mounted the head of the actuating cylinder, and two lateral fork joints at which are pivotably mounted feet of the links, the median and lateral fork joints being situated on an opposite side of the transmission piece from the lugs, and whereby said links move substantially parallel to the axis of the cylinder with a small lateral deflection.

2. A door thrust reverser for a jet engine having a rear body forming an outer wall and defining an internal channel for removing the gases, two doors hinged respectively about pivot means fixed to diametrically opposite beams secured to said rear body, one of said beams forming a totally closed caisson and having on a side thereof directed toward the internal channel for removing the gases a rear face forming a wall of said internal channel, two side members extending parallel to an axis of the engine; a front face formed by a removable cover; a cross piece connecting said two side members together to movably define a pivoting zone of said doors, said cross piece having two apertures; a base of the caisson being formed by a shoulder of the rear body between an outer wall of the rear body and said internal channel; said closed caisson enclosing a single operating device forcibly opening and closing the doors, said door thrust reverser comprising:
   an actuating cylinder pivotally mounted on said shoulder,
   a transmission piece hingedly mounted to pivot on said beams and on which is pivotally mounted a head of the actuating cylinder, extension and retraction of the cylinder causing rotation of the transmission piece,
   two links pivotally mounted to said transmission piece, extending through said two apertures of the cross piece and each of the links being coupled respectively to one of said doors, said rotation of the transmission piece being actuated by the cylinder and causing movement of said links through said apertures and corresponding movement of the doors, the transmission piece being pivotably suspended by two lugs mounted for pivoting on pivot pins secured to the side members of the beam, the transmission piece having a median fork joint in which is pivotably mounted the head of the actuating cylinder and two lateral fork joints for pivotably mounting feet of the links to the transmission piece, the median and lateral fork joints being situated on an opposite side of the transmission piece from the two lugs, and a distance between the lugs suspending the transmission piece and the median fork joint connecting the head of the actuating cylinder to the transmission piece being less than a distance between the lugs and the lateral fork joints where the links are pivoted to the transmission piece.

3. A door thrust reverser for a jet engine having a rear body forming an outer wall and defining an internal channel for removing the gases, two doors hinged respectively about pivot means fixed to diametrically opposite beams secured to said rear body, one of said beams forming a totally closed caisson and having on a side thereof directed toward the internal channel for removing the gases a rear face forming a wall of said internal channel, two side members extending parallel to an axis of the engine; a front face formed by a removable cover; a cross piece connecting said two side members together to movably define a pivoting zone of said doors, said cross piece having two apertures, a base of the caisson being formed by a shoulder of the rear body between an outer wall of the rear body and said internal channel; said closed caisson enclosing a single operating device forcibly opening and closing the doors, said door thrust reverser comprising:

- an actuating cylinder pivotally mounted on said shoulder,
- a transmission piece hingedly mounted to pivot on said beams and on which is pivotally mounted a head of the actuating cylinder, extension and retraction of the cylinder causing rotation of the transmission piece,
- two links pivotally mounted to said transmission piece, extending through said two apertures of the cross piece and each of the links being coupled respectively to one of said doors, said rotation of the transmission piece being actuated by the cylinder and causing movement of said links through said apertures and corresponding movement of the doors, the transmission piece being pivotably suspended by two lugs mounted for pivoting on pivot means fixed to the side members of the beam, the transmission piece having a median fork joint in which is pivotably mounted the head of the actuating cylinder and two lateral fork joints pivotably supporting feet of the links, the median and lateral fork joints being situated on an opposite side of the transmission piece from the lugs and the median and lateral fork joints pivotably securing the actuating cylinder and the links to the transmission piece being situated in a vicinity of a rear face of the caisson formed by the wall of the internal channel.

* * * * *